United States Patent
Xie (10) Patent No.: US 8,855,487 B2
(45) Date of Patent: Oct. 7, 2014

(54) METHOD AND DEVICE FOR OBTAINING ROUTING INFORMATION OF ELECTRO-OPTICAL MULTI-LAYER NETWORK

(75) Inventor: Gang Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 161 days.

(21) Appl. No.: 13/808,267

(22) PCT Filed: Nov. 15, 2010

(86) PCT No.: PCT/CN2010/078721
§ 371 (c)(1),
(2), (4) Date: Jan. 30, 2013

(87) PCT Pub. No.: WO2012/003686
PCT Pub. Date: Jan. 12, 2012

(65) Prior Publication Data
US 2013/0216223 A1    Aug. 22, 2013

(30) Foreign Application Priority Data
Jul. 5, 2010   (CN) .......................... 2010 1 0219856

(51) Int. Cl.
*H04J 14/00* (2006.01)
*H04J 14/02* (2006.01)
*H04L 12/751* (2013.01)

(52) U.S. Cl.
CPC ......... *H04J 14/0227* (2013.01); *H04J 14/0212* (2013.01); *H04L 45/02* (2013.01)
USPC .................... 398/48; 398/45; 398/49; 398/50; 398/57; 398/83

(58) Field of Classification Search
USPC ........... 398/45, 48, 83, 79, 49, 50, 51, 55, 56, 398/57, 59
See application file for complete search history.

(56) References Cited

U.S. PATENT DOCUMENTS

| | | | |
|---|---|---|---|
| 6,626,590 B1 * | 9/2003 | Nagatsu et al. | 398/59 |
| 7,933,519 B2 * | 4/2011 | Akiyama et al. | 398/50 |
| 2010/0077103 A1 | 3/2010 | Matsumoto | |

FOREIGN PATENT DOCUMENTS

| | | |
|---|---|---|
| CN | 1859043 A | 11/2006 |
| CN | 101677294 A | 3/2010 |
| CN | 101686201 A | 3/2010 |

OTHER PUBLICATIONS

International Search Report in international application No. PCT/CN2010/078721, mailed on Apr. 14, 2011.
English Translation of the Written Opinion of the International Search Authority in international application No. PCT/CN2010/078721, mailed on Apr. 14, 2011.

* cited by examiner

*Primary Examiner* — Hanh Phan
(74) *Attorney, Agent, or Firm* — Oppedahl Patent Law Firm LLC (57) ABSTRACT

The present disclosure provides a method and device for obtaining the routing information of an electro-optical multi-layer network. The ports on which an optical transmitter and an optical receiver are located are determined, and the electro-optical conversion information is added to the routing information on a port of the optical layer node side or the electro layer node side on which the optical transmitter and the optical receiver are located. The electro-optical conversion information includes but is not limited to the wavelength tuning capability and signal processing capability. Through the extending of the current Multi-Layer Network (MLN) information model and Wavelength Switched Optical Network (WSON) information model, the present disclosure describes the routing information including the electro-optical conversion information of the present disclosure more accurately, and perfects the electro-optical multi-layer network information model, and improves the accuracy of the path calculation to reach the optimization.

20 Claims, 4 Drawing Sheets

METHOD AND DEVICE FOR OBTAINING ROUTING INFORMATION OF ELECTRO-OPTICAL MULTI-LAYER NETWORK

TECHNICAL FIELD

The present disclosure relates to an Automatically Switched Optical Network (ASON) technology, and more particularly to a method and device for obtaining electro-optical conversion information in the routing information of an electro-optical multi-layer network.

BACKGROUND

In a traditional communication network, a dedicated service platform is constructed for each service, respectively. In this way, service resources can be hardly converged and shared, and operators have to maintain multiple service platforms simultaneously, thus causing waste of both network setup cost and maintenance resources.

High creditability network systems are supported by optical fiber-based transport networks. With the rapid development of data services, new patterns emerge constantly, including broadband multiservice transport and end-to-end bandwidth provision etc., and traditional Synchronous Digital Hierarchy (SDH) technology, Internet Protocol (IP) technology and Ethernet technology all fail to meet the comprehensive transport and bearing requirements of the Next Generation Network (NGN), thus there is an urgent need to set up a packet-oriented transport network form with higher efficiency and flexibility to serve as a basic platform for high-capacity information transport and exchange in the future, so as to construct a unified transport network.

An ideal unified transport network should be a converged network, i.e. different applications are carried by a unified transport network, and the key to build such a converged network is an ideal transport platform which should have the following features: integration of data, circuit and optical layer transport functions; provision of rapid multiservice switching function; possession of optical transparency to adapt to possible future protocols and services; possession of topological flexibility to expand services rapidly, which is in line with the tendency of network transformation; capability of unlimited extension of network link capacity and number of nodes; application of unified management of switching layers to realize interconnection with existing transport networks; and unified operation management and maintenance to improve network availability and realize rapid fault location.

Therefore, the Internet Engineering Task Force (IETF) puts forward the concept of Multi-Layer Network/Multi-Region Network (MLN/MRN). In a Generalized Multi-Protocol Label Switching (GMPLS) network, a switching capability is defined as a region, and a converged network having multiple switching capabilities is a Multi-Region Network (MRN), e.g. an IP network based on Wavelength Division Multiplexing (WDM), while a Multi-Layer Network (MLN) is defined more broadly, not only including MRN, but also including networks having different rates under the same switching capability, e.g. different types of rates in an SDH network.

In MLN model, two types of node are defined, one type is single switching capability node which has only one switching capability, and thus all link ports on the single switching capability node have the same switching capability. The other type is multiple switching capability node which has more than two switching capabilities. The multiple switching capability nodes can be further divided into single nodes and mixed nodes, wherein although the single nodes include two switching capabilities, switching matrice having different switching capabilities are not connected by internal links. Therefore, signals cannot be transmitted between link ports of different switching capabilities. However, switching matrice having two different switching capabilities in the mixed nodes are connected by internal links, therefore signals can be transmitted between link ports of two different switching capabilities.

In order to describe the switching capability of each link port in routing accurately, RFC4202 puts forward an Interface Switching Capability Descriptor (ISCD) and defines multiple switching capabilities, e.g. Time-Division Multiplexing (TDM) Capable is used for describing the port switching capability in an SDH device while Lambda-Switch Capable (LSC) is used for describing the port switching capability in a Reconfigurable Optical Add-Drop Multiplexer (ROADM). It is put forward in RFC4202 that the ISCDs at two ends of a link may be the same or different, e.g. the ISCDs of the ports at two ends of a link between two SDH devices may be all TDM while the ISCDs of ports between a link between an SDH device and an ROADM device are TDM and LSC, respectively.

To use ISCD broadly, the meaning of ISCD is extended. ISCD is defined to have two meanings. The first meaning can be used for describing the capability for switching one port to another in the same layer, while the second meaning is to connect the local terminating capability as a data link to another layer, i.e. the adaptive capability. For the examples above, if it is a link between two SDH devices, then ISCDs of the ports at two ends of the link indicates that a SDH signal of one local port is switched to a port of another link; if it is a link between an SDH device and an ROADM device, then the ISCDs of two ends of the link commonly indicates that wavelength signals are converted into SDH signals after being terminated inversely, or SDH signals are converted into wavelength signals after being terminated.

However, using ISCDs in the MLN network model cannot represent the terminating capabilities in all scenarios, e.g. a multiple switching capability node includes an SDH device and an ROADM device at the same time. At this time, the node includes a TDM link port and an LSC link port at the same time, and if two switching matrice are connected by an internal link, then signals can be transmitted between the TDM link port and the LSC link port. However, if there is no internal link, then the signals cannot be transmitted between the TDM link port and the LSC link port. The two scenarios above cannot be distinguished only by using ISCDs on the ports. Therefore, for the former scenario, the inter-layer adaptive capability of the internal link is described by adding an Interface Adjustment Capability Descriptor (IACD) on the LSC port.

In addition, due to the specificity of the optical layer devices, in an optical layer network, the resistance of optical layer devices needs to be described. IETF puts forward the concept of Wavelength Switched Optical Network (WSON) to describe associated information of a wavelength-based network separately, including port connectivity, wavelength conversion capability and 3R regeneration capability etc.

Figure 1:
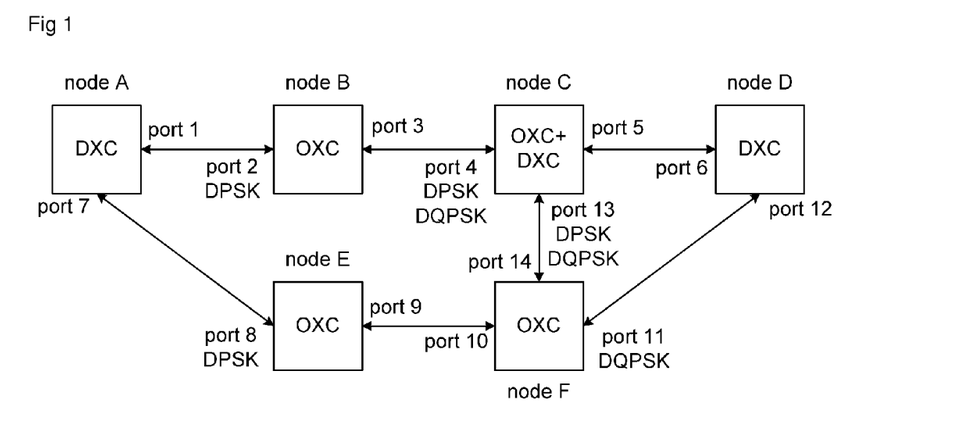
FIG. 1 is a schematic diagram illustrating an MLN information model in the prior art.

According to existing standards and techniques, related extension has been performed in an electro-optical multi-layer network model and a WSON model, but the information extended in the prior art is not enough for the electro-optical multi-layer network, which is analyzed in details as follows:

FIG. 1 is a schematic diagram illustrating an MLN information model in the prior art. As shown in FIG. 1, the links between Digital Cross-Connection (DXC) nodes and Optical Cross-Connection (OXC) nodes are described by different ISCDs, e.g. for the link between node A and node B, the switching capability in the ISCD of port 1 is TDM, while the switching capability in the ISCD of port 2 is LSC, thus the adaptive capability between the optical-electro layers between node A and node B can be described by the ISCDs of port 1 and port 2. However, for node C, since it is a mixed node, the switching capability in the ISCD of port 4 is LSC, and the switching capability in the ISCD of port 5 is TDM. Since OXC and DXC in the node are connected by an internal link, an IACD is required to be added on port 4 to describe the adaptive capability of the internal link. Currently, a complete routing information descriptor in an MLN information model as shown in FIG. 1 includes:

Port 1: ISCD (switching capability=TDM);
Port 2: ISCD (switching capability=LSC);
Port 3: ISCD (switching capability=LSC);
Port 4: ISCD (switching capability=LSC), IACD (adaptive capability=TDM adaptive LSC);
Port 5: ISCD (switching capability=TDM);
Port 6: ISCD (switching capability=TDM);
Port 7: ISCD (switching capability=TDM);
Port 8: ISCD (switching capability=LSC);
Port 9: ISCD (switching capability=LSC);
Port 10: ISCD (switching capability=LSC);
Port 11: ISCD (switching capability=LSC);
Port 12: ISCD (switching capability=TDM);
Port 13: ISCD (switching capability=LSC), IACD (adaptive capability=TDM adaptive LSC);
Port 14: ISCD (switching capability=LSC).

Therefore, in path selection, 4 paths may be selected based on the above routing information, i.e. A-B-C-D, A-E-F-D, A-B-C-F-D and A-E-F-C-D. Meanwhile, it is assumed that port 2 and port 8 are associated with an optical transmitter and optical receiver, and the modulation mode is Differential Phase Shift Keying (DPSK). Port 11 is associated with an optical transmitter and optical receiver, and the modulation mode is Differential Quaternary Phase Shift Keying (DQPSK) during electro-optical conversion, and node C includes multiple internal links, each of which is associated with a set of optical transmitter and optical receiver, wherein the modulation mode of optical transmitters and optical receivers associated with part of the internal links is DPSK, while the modulation mode of optical transmitters and optical receivers associated with other internal links is DQPSK. It can be seen from the information above that in the 4 obtained paths, A-E-F-D is actually unavailable, and other remaining paths are not necessarily available, which is also related to internal path selection.

Figure 2:
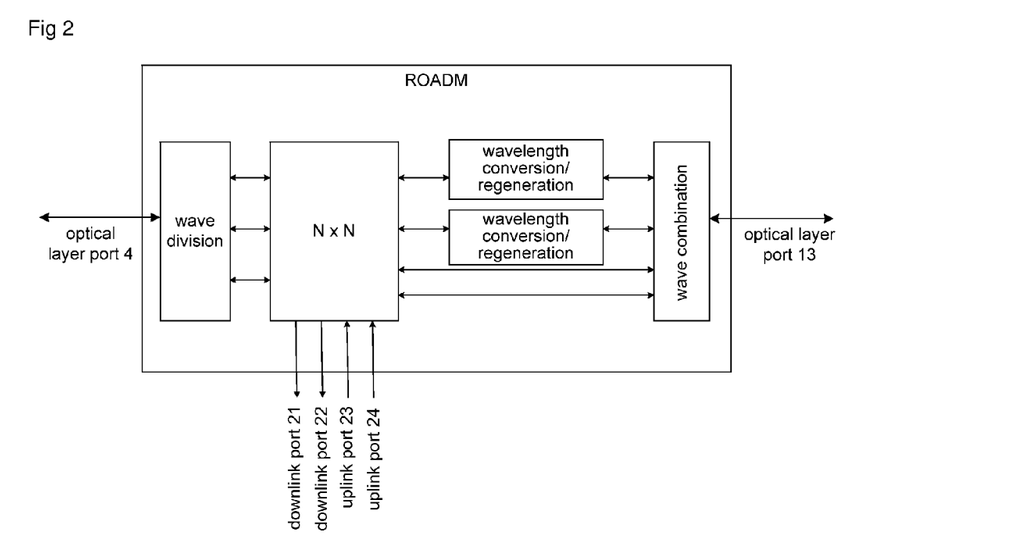
FIG. 2 is a schematic diagram illustrating an embodiment of a WSON model in the prior art.

FIG. 2 is a schematic diagram illustrating an embodiment of a WSON model in the prior art, and corresponds to the OXC part of node C in FIG. 1, internal restriction mainly includes the following information:

Connectivity: if it is fully connected, then port 4 is connected with port 13, and port 4 and port 13 are further connected to all uplink and downlink ports (i.e. downlink port 21, downlink port 22, uplink port 23 and uplink port 24);

Wavelength conversion or regeneration capability: the accessibility of a wavelength convertor/regenerator, wavelength input range, wavelength output range, 3R regeneration capability, and the use conditions of the wavelength convertor/regenerator etc.;

Port wavelength constraint: initial wavelength range and available wavelength information.

As shown in FIG. 2, in the WSON model, the uplink ports and downlink ports do not have the information related to the optical transmitter and optical receiver. Thus, the availability of the path A-B-C-F-D and how to select an internal path cannot be obtained during path calculation.

It can be learnt from FIG. 1 and FIG. 2, for the description based on an electro-optical multi-layer network, the routing information in the current WSON and MLN is not enough. More specifically, in the current MLN model, if the network is a multi-layer network consisting of single switching capability nodes or single nodes of multiple switching capability nodes, the adaptive capability between networks of different layers can be described by different ISCDs at two ends of a link. However, if the multi-layer network includes mixed nodes, then IACD information needs to be added to link ports of service layers in the hybrid network to describe the adaptive capability between networks of different layers in the mixed nodes. Meanwhile, resistance information in the WSON network is described through extension. However, due to the specificity of the electro-optical multi-layer, when establishing a connection, an electro layer connection needs to pass through an optical layer network, then optical transmitters/optical receivers associated with the link at the edges of two sides of the optical layer network, i.e. the link configured for adaption between optical-electro nodes, need to have the same signal processing capability. Meanwhile, if wavelength consistency of bidirectional connection is required, then optical transmitters at the two sides further need to be able to tune the same wavelength. However, the information is absent in existing MLN and WSON information models. It can be analyzed from FIG. 1 and FIG. 2, the routing information above still fail to describe the electro-optical network accurately. Therefore, during path calculation, errors may be caused to the calculation result or the path calculation may not be optimized due to the lack of the information.

SUMMARY

In view of this, the main purpose of the present disclosure is to provide a method and device for obtaining the routing information of an electro-optical multi-layer network so as to describe the routing information of the electro-optical multi-layer network more accurately, perfect the electro-optical multi-layer network information model, and improve the accuracy of the path calculation to reach the optimization.

To realize the purpose above, the technical solution of the disclosure is implemented in the following way:

The disclosure provides a method for obtaining the routing information of an electro-optical multi-layer network, including:

ports on which an optical transmitter and an optical receiver are located are determined, and the electro-optical conversion information is added to the routing information on a port of an optical layer node side or an electro layer node side on which the optical transmitter and the optical receiver are located.

In the solution above, the electro-optical multi-layer network does not include a mixed node. For a link between the optical layer node and the electro layer node, the method may include:

when it is determined that the optical transmitter and the optical receiver are located on the port of the optical layer node side, the electro-optical conversion information is added to the routing information on the port of the optical layer node side;

when it is determined that the optical transmitter and the optical receiver are located on the port of the electro layer node side, the electro-optical conversion information is added to the routing information on the port of the electro layer node side.

In the solution above, the electro-optical multi-layer network includes a mixed node. For a link between the optical layer node and the electro layer node, the method may include:

when it is determined that the optical transmitter and the optical receiver are located on the port of the optical layer node side, the electro-optical conversion information is added to the routing information on the port of the optical layer node side;

when it is determined that the optical transmitter and the optical receiver are located on the port of the electro layer node side, the electro-optical conversion information is added to the routing information on the port of the electro layer node side;

and the electro-optical conversion information is added to each internal link information of the mixed node.

In the solution above, the electro-optical conversion information may include: the wavelength tuning capability and signal processing capability.

In the solution above, the wavelength tuning capability may include: the tuning feasibility, the tuning range and the tuning time.

In the solution above, the signal processing capability may include: the Forward Error Correction (FEC) technology, the modulation technology, and the type of a modulated electric signal.

In the solution above, the method further may include: flooding the routing information of the electro-optical multi-layer network.

The disclosure further provides a device for obtaining the routing information of an electro-optical multi-layer network, including at least a determining module and an obtaining module, wherein the determining module is configured to determine ports on which an optical transmitter and an optical receiver are located and send the determined ports to the obtaining module;

the obtaining module is configured to, after receiving the ports sent by the determining module, add the electro-optical conversion information to the routing information on a port of an optical layer node side or an electro layer node side on which the optical transmitter and the optical receiver are located.

In the solution above, the electro-optical multi-layer network does not include a mixed node. For a link between the optical layer node and the electro layer node, the obtaining module may be configured to:

when it is determined that the optical transmitter and the optical receiver are located on the port of the optical layer node side, add the electro-optical conversion information to the routing information on the port of the optical layer node side;

when it is determined that the optical transmitter and the optical receiver are located on the port of the electro layer node side, add the electro-optical conversion information to the routing information on the port of the electro layer node side.

In the solution above, the electro-optical multi-layer network includes a mixed node. For a link between the optical layer node and the electro layer node, the obtaining module may be configured to:

when it is determined that the optical transmitter and the optical receiver are located on the port of the optical layer node side, add the electro-optical conversion information to the routing information on the port of the optical layer node side;

when it is determined that the optical transmitter and the optical receiver are located on the port of the electro layer node side, add the electro-optical conversion information to the routing information on the port of the electro layer node side;

and add the electro-optical conversion information to each internal link information of the mixed node.

In the solution above, the device may further include: a processing module configured to flood the routing information of the electro-optical multi-layer network.

It can be seen from the above technical solution provided by the disclosure comprises: determining ports on which an optical transmitter and an optical receiver are located, and adding electro-optical conversion information to the routing information on a port of an optical layer node side or an electro layer node side on which the optical transmitter and the optical receiver are located. The electro-optical conversion information includes but is not limited to the wavelength tuning capability and signal processing capability. Through the extending of the current MLN information model and WSON information model, the present disclosure describes the routing information including the electro-optical conversion information of the disclosure more accurately, and perfects the electro-optical multi-layer network information model, and improves the accuracy of the path calculation to reach the optimization.

DETAILED DESCRIPTION

Among the devices involved in the disclosure, the following devices which have been described in details in related standards and technical documents are only illustrated briefly here:

an optical transmitter is configured to encode signals sent by an electro multiplexing device, perform electro-optical conversion to the signals through modulation and couple the signals into an optical fiber;

an optical receiver is configured to perform optical-electro conversion to the wavelengths received from the optical fiber through demodulation, restore the signals through decoding and then send the signals into the electro multiplexing device;

the OXC is configured to perform wavelength switching, e.g. the ROADM can be regarded as an OXC device;

the DXC is configured to switch electro layer signals between different link ports, e.g. the cross single board in the SDH device is an electrical switching matrix;

the fiber link is configured to connect physical fibers between two nodes;

the internal link is configured to, when a node is a mixed node, connect optical fibers between the OXC and the DXC. Although the internal link is similar to a fiber link, the link described as an internal link to show the difference because it is inside the node. Similar to the fiber link, the internal link information is used for describe the information of the internal link which connects the OXC and the DXC, but the information can be tailored and mainly includes port Identifiers (ID) etc.

Figure 3:
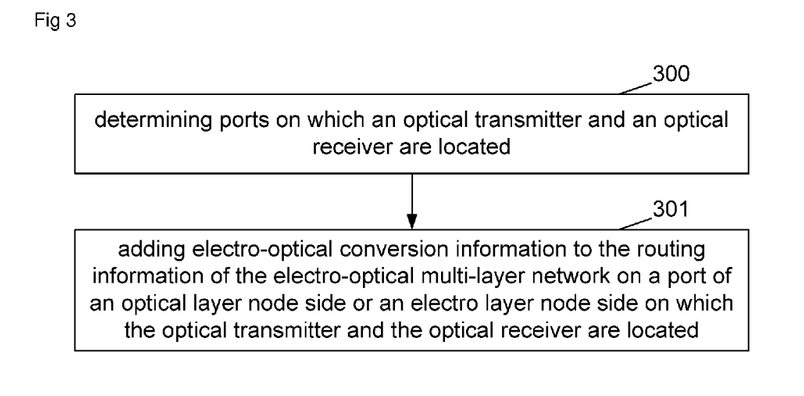
FIG. 3 is a flowchart illustrating a method for obtaining the routing information of an electro-optical multi-layer network according to the present disclosure.

FIG. 3 is a flowchart illustrating a method for obtaining the routing information of an electro-optical multi-layer network of the disclosure. As shown in FIG. 3, the method for obtaining the routing information of the electro-optical multi-layer network of the disclosure mainly includes:

Step 300: the ports on which an optical transmitter and an optical receiver are located are determined;

in this step, the ports may be determined manually or determined by protocol interaction, e.g. through Multilink Protocols (MP) etc., and the specific implementations are well known in the art, which will not be repeated here.

Step 301: the electro-optical conversion information is added to the routing information on a port of an optical layer node side or an electro layer node side on which the optical transmitter and the optical receiver are located. The electro-optical conversion information includes but is not limited to a wavelength tuning capability and a signal processing capability.

the wavelength tuning capability is used for describing the wavelength tuning-related information of the optical transmitter and the wavelength tuning information of the optical transmitter mainly includes: the tuning feasibility, the tuning range and the tuning time etc.

The signal processing capability is used for describing some related technologies used when the optical transmitter or the optical receiver performs electro-optical or optical-electro conversion, e.g. the forward error correction FEC technology, the modulation technology, and the type of a modulated electric signal etc.

More specifically, in an electro-optical multi-layer network without a mixed node, for a link between the optical layer node and the electro layer node, if the optical transmitter and optical receiver are located on the port of the optical layer node side, then the electro-optical conversion information is added to the routing information on the port of the optical layer node side; if the optical transmitter and optical receiver are located on the port of the electro layer node side, then the electro-optical conversion information is added to the routing information on the port of the electro layer node side.

In an electro-optical multi-layer network with a mixed node, for a link between the optical layer node and the electro layer node, if the optical transmitter and optical receiver are located on the port of the optical layer node side, then the electro-optical conversion information is added to the routing information on the port of the optical layer node side; if the optical transmitter and optical receiver are located on the port of the electro layer node side, then the electro-optical conversion information is added to the routing information on the port of the electro layer node side. Especially, for a mixed node, since each internal link is associated with a set of optical transmitter and receiver, the electro-optical conversion information is added to the internal link information, e.g. the wavelength tuning capability and the signal processing capability. Flooding the internal link information is required.

In practical use, the added electro-optical conversion information above of the disclosure may be described by the following method:

<wavelength tuning capability>::=<tuning feasibility identification><tuning range><tuning time>;

<signal processing capability>::=<FEC capability linked list><modulation mode linked list><signal type linked list>;

<internal link>::=<port ID><wavelength tuning capability><signal processing capability>;

according to the method of the disclosure, a device for obtaining the routing information of an electro-optical multi-layer network is further provided and at least includes a determining module and an obtaining module, wherein the determining module is configured to determine ports on which an optical transmitter and an optical receiver are located and send the determined ports to the obtaining module;

the obtaining module is configured to, after receiving the ports sent by the determining module, add the electro-optical conversion information to the routing information on a port of an optical layer node side or an electro layer node side on which the optical transmitter and the optical receiver are located.

When the electro-optical multi-layer network of the optical layer node or the electro layer node does not include a mixed node, and for a link between the optical layer node and the electro layer node, the obtaining module is specifically configured to: when it is determined that the optical transmitter and the optical receiver are located on the port of the optical layer node side, add the electro-optical conversion information to the routing information on the port of the optical layer node side; when it is determined that the optical transmitter and the optical receiver are located on the port of the electro layer node side, add the electro-optical conversion information to the routing information on the port of the electro layer node side.

When the electro-optical multi-layer network of the optical layer node or the electro layer node includes a mixed node, and for a link between the optical layer node and the electro layer node, the obtaining module is specifically configured to: when it is determined that the optical transmitter and the optical receiver are located on the port of the optical layer node side, add the electro-optical conversion information to the routing information on the port of the optical layer node side; when it is determined that the optical transmitter and the optical receiver are located on the port of the electro layer node side, add the electro-optical conversion information to the routing information on the port of the electro layer node side; and add the electro-optical conversion information to each internal link information of the mixed node in the multi-layer network.

The device of the disclosure may further include: a processing module configured to flood the routing information of the electro-optical multi-layer network.

The method for obtaining the routing information of an electro-optical multi-layer network of the disclosure is described in detail below in combination with the embodiments.

Figure 4:
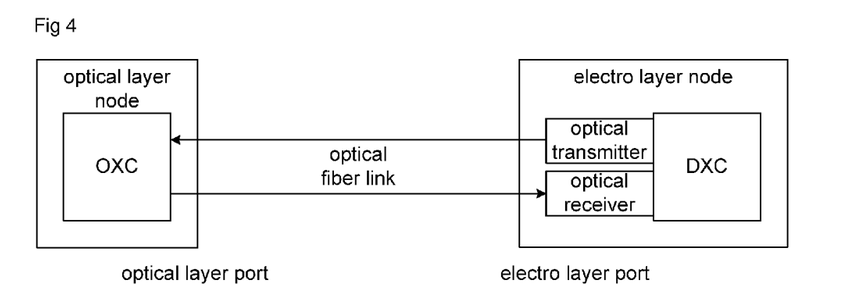
FIG. 4 is a schematic diagram illustrating the first embodiment of obtaining the routing information of an electro-optical multi-layer network according to the present disclosure.

FIG. 4 is a schematic diagram illustrating the first embodiment of obtaining the routing information of an electro-optical multi-layer network without mixed node according to the present disclosure. As shown in FIG. 4, assume that the optical transmitter and optical receiver are associated with the link port of the electro layer node side, i.e. the optical transmitter and optical receiver are located at the electro layer node side, and then the routing information on the electro layer link port needs to be extended. The information which needs to be flooded according to the method of the present disclosure includes:

<link information (optical layer node side)>::=<ISCD>; wherein the switching capability in the ISCD is LSC;

<link information (electro layer node side)>:= <ISCD><wavelength tuning capability><signal processing capability>, wherein the switching capability in the ISCD is TDM.

Figure 5:
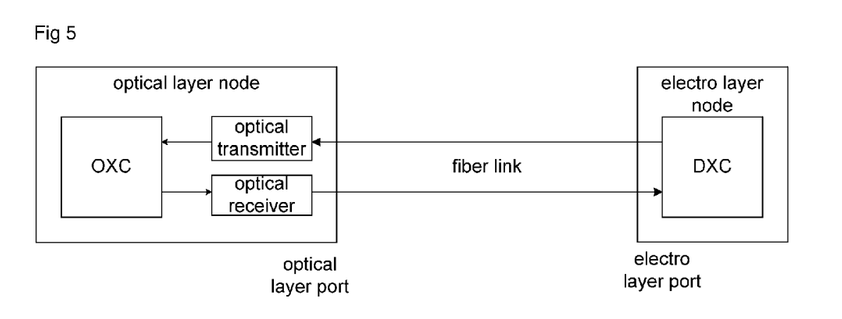
FIG. 5 is a schematic diagram illustrating the second embodiment of obtaining the routing information of an electro-optical multi-layer network according to the present disclosure.

FIG. 5 is a schematic diagram illustrating the second embodiment of obtaining the routing information of an electro-optical multi-layer network without a mixed node according to the present disclosure. As shown in FIG. 5, assume that the optical transmitter and optical receiver are associated with the link port of the optical layer node side, i.e. the optical transmitter and optical receiver are located at the optical layer node side, and then the routing information on the optical layer link port needs to be extended. The information which needs to be flooded according to the method of the present disclosure includes:

<link information (optical layer node side)>:= <ISCD><wavelength tuning capability><signal processing capability>, wherein the switching capability in the ISCD is LSC;

<link information (electro layer node side)>::=<ISCD>; wherein the switching capability in the ISCD is TDM.

Figure 6:
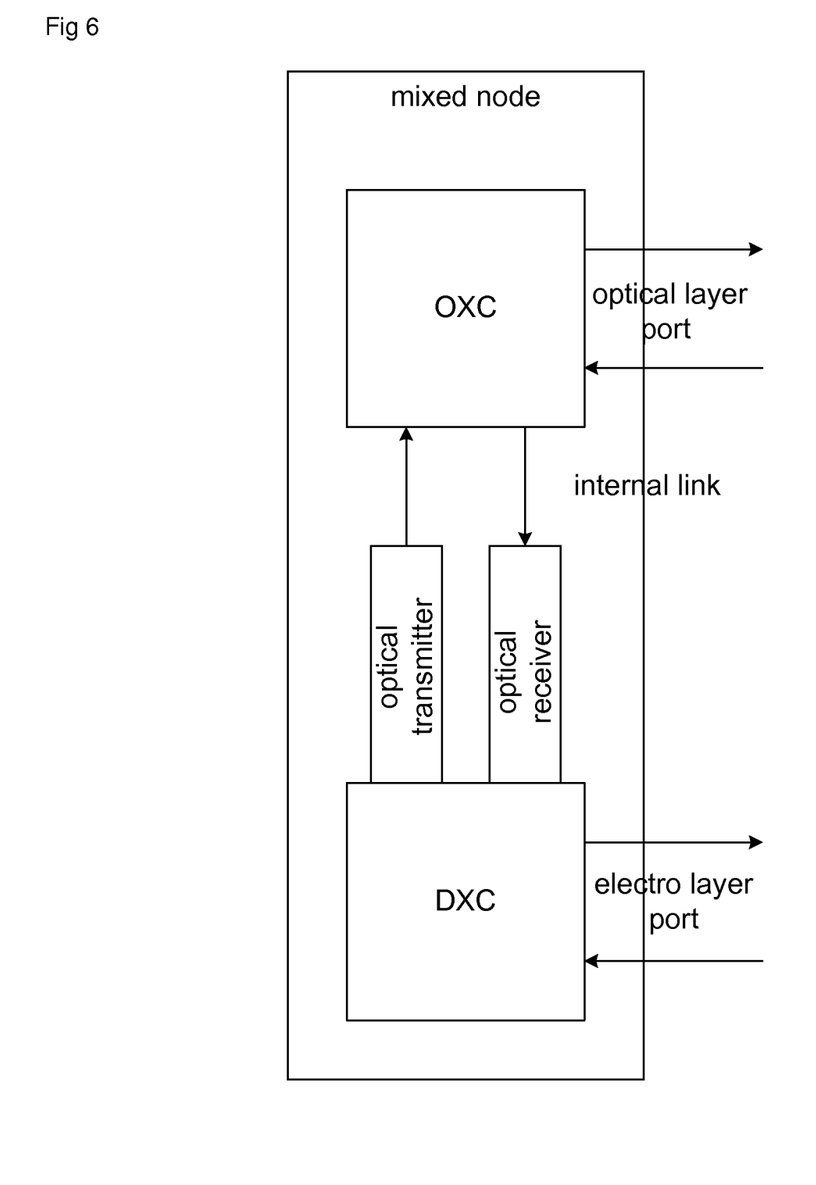
FIG. 6 is a schematic diagram illustrating the third embodiment of obtaining the routing information of an electro-optical multi-layer network according to the present disclosure.

FIG. 6 is a schematic diagram illustrating the third embodiment of obtaining the routing information of an electro-optical multi-layer network with a mixed node according to the present disclosure. As shown in FIG. 6, each internal link can be associated with a set of optical transmitter and receiver, and the internal link information needs to be flooded through the node information. The information which needs to be flooded includes:

<link information (optical layer node side)>::= <ISCD><IACD>, wherein the switching capability in the ISCD is LSC, while the switching capability adapted in the IACD is LSC and TDM;

<link information (electro node side)>::=<ISCD>; wherein the switching capability in the ISCD is TDM;

<node information>::=<internal link linked list>;

where <internal link linked list>::=<internal link><internal link linked list>;

<internal link>::=<port ID><wavelength tuning capability><signal processing capability>.

Figure 7:
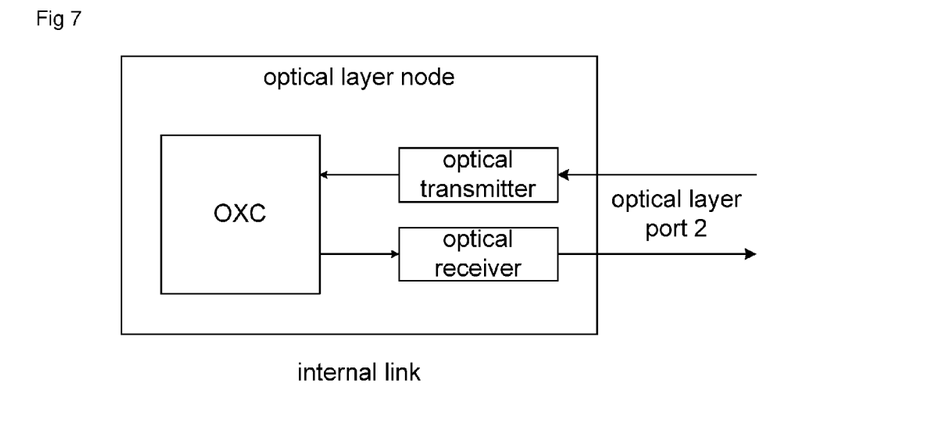
FIG. 7 is a schematic diagram illustrating an information model of node B in FIG. 1 in an electro-optical multi-layer network according to the present disclosure.

In combination with FIG. 1, FIG. 7 is a schematic diagram illustrating an information model of node B in FIG. 1 in an electro-optical multi-layer network according to the present disclosure. As shown in FIG. 7, assume that port 2 is associated with the optical transmitter and the optical receiver and is connected with an uplink port and a downlink port. Therefore, the uplink and downlink ports may be replaced by port 2 to describe the connectivity in the WSON model.

Figure 8:
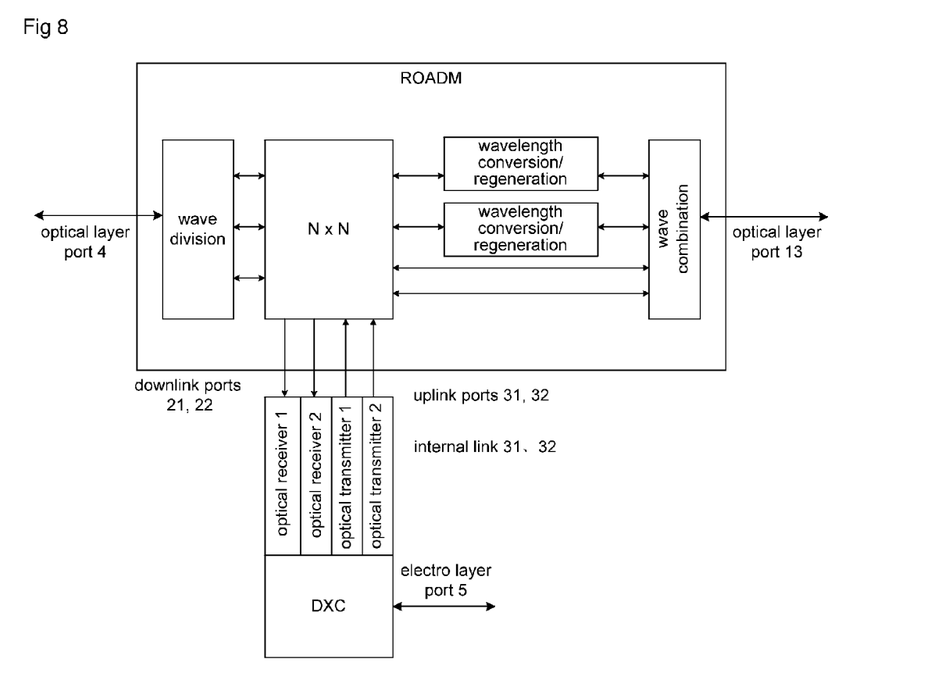
FIG. 8 is a schematic diagram illustrating an information model of node C in FIG. 1 in an electro-optical multi-layer network according to the present disclosure.

In combination with FIG. 1, FIG. 8 is a schematic diagram illustrating an information model of node C in FIG. 1 in an electro-optical multi-layer network according to the present disclosure. As shown in FIG. 8, since the optical transmitter and optical receiver are generally a group, the downlink port 21, the uplink port 23, the optical receiver 1 and the optical transmitter 1 are abstracted to be the internal link 31. Here, abstracting them into the internal link 31 refers to regarding them as the internal link 31. The downlink port 22, the uplink port 24, the optical receiver 2 and the optical transmitter 2 are abstracted to be the internal link 32. Here, abstracting them into the internal link 32 refers to regarding them as the internal link 32. Assume that the modulation mode of the optical receiver 1 and the optical transmitter 1 is DPSK, while the modulation mode of the optical receiver 2 and the optical transmitter 2 is DQPSK, then the routing information of the electro-optical multi-layer network of node C in the present disclosure includes:

Connectivity: the internal link 31, the internal link 32, the optical layer port 4 and the optical layer port 13 are all connected; <internal link (31)>::=<port ID><wavelength tuning capability><signal processing capability>(modulation mode=DPSK), wherein the port ID is 31;

<internal link (32)>::=<port ID><wavelength tuning capability><signal processing capability>(modulation mode=DQPSK), wherein the port ID is 32.

The adaptive capability between the ports having different switching capabilities in the mixed nodes is described clearly and completely by describing the information of the electro-optical multi-layer network of FIG. 8 of the disclosure.

Based on the extension to the electro-optical multi-layer network of the disclosure, only the modulation mode is illustrated specifically herein and other extensions are similar. For FIG. 1, the complete information descriptor of the electro-optical multi-layer network includes:

port 1: ISCD (switching capability=TDM);

port 2: ISCD (switching capability=LSC), wavelength tuning capability, signal processing capability (modulation mode=DPSK);

port 3: ISCD (switching capability=LSC);

port 4: ISCD (switching capability=LSC), IACD (adaptive capability=TDM adaptive LSC);

port 5: ISCD (switching capability=TDM);

port 6: ISCD (switching capability=TDM);

port 7: ISCD (switching capability=TDM);

port 8: ISCD (switching capability=LSC), wavelength tuning capability, signal processing capability (modulation mode=DPSK);

port 9: ISCD (switching capability=LSC);

port 10: ISCD (switching capability=LSC);

port 11: ISCD (switching capability=LSC), wavelength tuning capability, signal processing capability (modulation mode=DQPSK);

port 12: ISCD (switching capability=TDM);

port 13: ISCD (switching capability=LSC), IACD (adaptive capability=TDM adaptive LSC);

port 14: ISCD (switching capability=LSC), and the extension information of the information model of the multi-layer network of node C has been provided in FIG. 8, including:

Connectivity: the internal link 31, the internal link 32, the optical layer port 4 and the optical layer port 13 are all connected;

<internal link (31)>::=<port ID><wavelength tuning capability><signal processing capability>(modulation mode=DPSK), wherein the port ID is 31;

<internal link (32)>::=<port ID><wavelength tuning capability><signal processing capability>(modulation mode=DQPSK), wherein the port ID is 32.

It can be learnt according to the information model of the electro-optical multi-layer network of the disclosure that there are 3 available paths between node A and node D, wherein in the information spaced by ".", the information in front of the "." represents a node and the information following the "." represents the port of the node;

path 1: A.1-B.2-B.3-C.4(–C.31)-C.5-D.6; in path 1, the internal link 31 is used in the node C;

path 2: A.1-B.2-B.3-C.4(–C.31-C.32)-C.13-F.14-F.11-D.6; in path 2, the internal link 31 and the internal link 32 are used in the node C, and the internal 31 and the internal link 32 are switched by DXC;

path 3: A.7-E.8-E.9-F.10-F.14-C.13(–C.31)-C.5-D.6; in the path, the internal link 31 is used in the node C.

The disclosure describes the routing information of the electro-optical multi-layer network more accurately by extending the MLN information model and the WSON information in the prior art, i.e. the routing information of the electro-optical multi-layer network includes the electro-optical conversion information of the present disclosure, thus perfecting the electro-optical multi-layer network information model, and improving the accuracy of the path calculation to reach the optimization.

What described above are only preferred embodiments of the disclosure, but are not intended to limit the protection scope of the disclosure, and any modifications, equivalent replacements, improvements and the like within the spirit and principle of the disclosure shall fall within the scope of protection of the disclosure.

The invention claimed is:

1. A method for obtaining routing information of an electro-optical multi-layer network, comprising:
   determining ports on which an optical transmitter and an optical receiver are located; and
   adding electro-optical conversion information to the routing information on a port of an optical layer node side or an electro layer node side on which the optical transmitter and the optical receiver are located.

2. The method according to claim 1, wherein the electro-optical multi-layer network does not include a mixed node, and for a link between the optical layer node and the electro layer node, the method comprises:
   adding the electro-optical conversion information to the routing information on the port of the optical layer node side when it is determined that the optical transmitter and the optical receiver are located on the port of the optical layer node side;
   adding the electro-optical conversion information to the routing information on the port of the electro layer node side when it is determined that the optical transmitter and the optical receiver are located on the port of the electro layer node side.

3. The method according to claim 2, wherein the electro-optical conversion information comprises: a wavelength tuning capability and a signal processing capability.

4. The method according to claim 3, wherein the wavelength tuning capability comprises: tuning feasibility, a tuning range and a tuning time.

5. The method according to claim 3, wherein the signal processing capability comprises: the Forward Error Correction technology, the modulation technology, and the type of a modulated electric signal.

6. The method according to claim 1, wherein the electro-optical multi-layer network includes a mixed node, and for a link between the optical layer node and the electro layer node, the method comprises:
   adding the electro-optical conversion information to the routing information on the port of the optical layer node side when it is determined that the optical transmitter and the optical receiver are located on the port of the optical layer node side;
   adding the electro-optical conversion information to the routing information on the port of the electro layer node side when it is determined that the optical transmitter and the optical receiver are located on the port of the electro layer node side; and
   adding the electro-optical conversion information to each internal link information of the mixed node.

7. The method according to claim 6, wherein the electro-optical conversion information comprises: a wavelength tuning capability and a signal processing capability.

8. The method according to claim 7, wherein the wavelength tuning capability comprises: tuning feasibility, a tuning range and a tuning time.

9. The method according to claim 7, wherein the signal processing capability comprises: the Forward Error Correction technology, the modulation technology, and the type of a modulated electric signal.

10. The method according to claim 1, wherein the electro-optical conversion information comprises: a wavelength tuning capability and a signal processing capability.

11. The method according to claim 10, wherein the wavelength tuning capability comprises: tuning feasibility, a tuning range and a tuning time.

12. The method according to claim 10, wherein the signal processing capability comprises: the Forward Error Correction technology, the modulation technology, and the type of a modulated electric signal.

13. The method according to claim 10, wherein the method further comprises: flooding the routing information of the electro-optical multi-layer network.

14. A device for obtaining the routing information of an electro-optical multi-layer network, comprising at least a determining module and an obtaining module, wherein
   the determining module is configured to determine ports on which an optical transmitter and an optical receiver are located and send the determined ports to the obtaining module;
   the obtaining module is configured to, after receiving the ports sent by the determining module, add the electro-optical conversion information to the routing information on a port of an optical layer node side or an electro layer node side on which the optical transmitter and the optical receiver are located.

15. The device according to claim 14, wherein the electro-optical multi-layer network does not include a mixed node, and for a link between the optical layer node and the electro layer node, the obtaining module configured to:
   add the electro-optical conversion information to the routing information on the port of the optical layer node side when it is determined that the optical transmitter and the optical receiver are located on the port of the optical layer node side;
   adding the electro-optical conversion information to the routing information on the port of the electro layer node side when it is determined that the optical transmitter and the optical receiver are located on the port of the electro layer node side.

16. The device according to claim 15, wherein the electro-optical conversion information comprises: a wavelength tuning capability and a signal processing capability.

17. The device according to claim 14, wherein the electro-optical multi-layer network includes a mixed node, and for a link between the optical layer node and the electro layer node, the obtaining module is configured to:
   add the electro-optical conversion information to the routing information on the port of the optical layer node side when it is determined that the optical transmitter and the optical receiver are located on the port of the optical layer node side;

add the electro-optical conversion information to the routing information on the port of the electro layer node side when it is determined that the optical transmitter and the optical receiver are located on the port of the electro layer node side; and add the electro-optical conversion information to each internal link information of the mixed node.

18. The device according to claim 17, wherein the electro-optical conversion information comprises: a wavelength tuning capability and a signal processing capability.

19. The device according to claim 14, wherein the electro-optical conversion information comprises: a wavelength tuning capability and a signal processing capability.

20. The device according to claim 19 wherein the device further comprises:

a processing module configured to flood the routing information of the electro-optical multi-layer network.

\* \* \* \* \*